United States Patent
Li

(10) Patent No.: US 12,156,251 B2
(45) Date of Patent: Nov. 26, 2024

(54) METHOD AND APPARATUS FOR BWP SWITCHING INDICATION ON UNLICENSED SPECTRUM

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 295 days.

(21) Appl. No.: 17/625,857

(22) PCT Filed: Jul. 11, 2019

(86) PCT No.: PCT/CN2019/095644
§ 371 (c)(1),
(2) Date: Jan. 10, 2022

(87) PCT Pub. No.: WO2021/003747
PCT Pub. Date: Jan. 14, 2021

(65) Prior Publication Data
US 2022/0264643 A1    Aug. 18, 2022

(51) Int. Cl.
*H04W 74/08*   (2024.01)
*H04L 5/00*    (2006.01)
(Continued)

(52) U.S. Cl.
CPC ....... *H04W 74/0816* (2013.01); *H04L 5/0051* (2013.01); *H04W 72/044* (2013.01); *H04W 74/006* (2013.01); *H04W 74/0866* (2013.01)

(58) Field of Classification Search
CPC ..... H04B 7/0691; H04L 5/001; H04L 5/0023; H04L 5/0042; H04L 5/0051;
(Continued)

(56) References Cited

U.S. PATENT DOCUMENTS

2019/0141734 A1    5/2019   Lei et al.
2020/0314885 A1*  10/2020   Cirik ..................... H04L 5/0048
(Continued)

FOREIGN PATENT DOCUMENTS

CN    109565834 A    4/2019
CN    109804662 A    5/2019
(Continued)

OTHER PUBLICATIONS

PCT/CN2019/095644 English translation of International Search Report dated Apr. 16, 2020, 2 page.
(Continued)

*Primary Examiner* — Liton Miah
(74) *Attorney, Agent, or Firm* — Cozen O'Connor

(57) ABSTRACT

A method and apparatus for BWP switching indication on an unlicensed spectrum. A base station sends BWP switching indication information through a second antenna panel. The BWP switching indication information is configured to indicate a first target BWP to be switched to when a terminal communicates with a first antenna panel of the base station. The first target BWP including N BWUs in M BWUs detected by the first antenna panel to be idle. N is smaller than or equal to M, and M and N are positive integers. After
(Continued)

receiving the BWP switching indication information, a terminal switches to the first target BWP for communicating with the first antenna panel.

18 Claims, 3 Drawing Sheets

(51) Int. Cl.
*H04W 72/04* (2023.01)
*H04W 72/044* (2023.01)
*H04W 74/00* (2009.01)
*H04W 74/0816* (2024.01)

(58) Field of Classification Search
CPC .. H04L 5/0098; H04L 5/0008; H04W 72/044; H04W 74/006; H04W 74/0816; H04W 74/0866; H04W 72/0453; Y02D 30/70
See application file for complete search history.

(56) References Cited

U.S. PATENT DOCUMENTS

| | | | |
|---|---|---|---|
| 2021/0168714 A1* | 6/2021 | Guan | H04W 52/16 |
| 2021/0281301 A1* | 9/2021 | Takano | H04B 7/0695 |
| 2022/0166482 A1* | 5/2022 | Yu | H04B 1/0458 |
| 2022/0201764 A1* | 6/2022 | Myung | H04W 74/0808 |

FOREIGN PATENT DOCUMENTS

| | | |
|---|---|---|
| JP | 2016515337 A | 5/2016 |
| WO | WO 2018082791 A1 | 5/2018 |
| WO | WO 2019094781 A2 | 5/2019 |
| WO | WO 2019098750 A1 | 5/2019 |

OTHER PUBLICATIONS

Xiaomi: "Discussion on DL signals for NR-U", 3GPP TSG RAN WG1 Meeting #95 R1-1813361, Nov. 2018, 3 pages.
Japanese Patent Application No. 2022-501006, Office Action dated Aug. 1, 2023, 4 pages.
Japanese Patent Application No. 2022-501006, English translation of Office Action dated Aug. 1, 2023, 4 pages.
European Patent Application No. 19937203.8, Search and Opinion dated Feb. 16, 2023, 11 pages.
Vivo "Discussion on the channel access procedures" 3GPP TSG RAN WG1 Meeting #94, R1-1808237; Aug. 2018, 6 pages.
Japanese Patent Application No. 2022-501006, Office Action dated Jan. 24, 2023, 3 pages.
Japanese Patent Application No. 2022-501006, English translation of Office Action dated Jan. 24, 2023, 3 pages.
Indian Patent Application No. 202247006718, Search and Opinion dated Jun. 26, 2024, 3 pages.

* cited by examiner

METHOD AND APPARATUS FOR BWP SWITCHING INDICATION ON UNLICENSED SPECTRUM

CROSS-REFERENCE TO RELATED APPLICATION

This application is the US national phase application of International Application No. PCT/CN2019/095644, filed on Jul. 11, 2019, the entire content of which is incorporated herein by reference for all purposes.

TECHNICAL FIELD

Embodiments of the disclosure relates to the field of communication technologies, and more particularly to a method and an apparatus for BWP (bandwidth part) switching indication on an unlicensed spectrum, and a storage medium.

BACKGROUND

With the development of communication technology and greater demand for transmission bandwidth, the concepts of unlicensed spectrum and BWP have been proposed. A base station and a terminal can communicate on the unlicensed spectrum, and the base station can configure multiple BWPs for the terminal. By selecting an activated BWP from the multiple BWPs, the terminal can communicate with the base station through the activated BWP.

When the base station uses the currently activated BWP to communicate with the terminal, it may find that a channel quality of the current activated BWP is poor, or a bandwidth of the current activated BWP does not match an amount of data to be transmitted. If these or similar conditions are identified, the base station can choose to switch to another BWP, and the base station can notify the terminal to switch to another BWP by sending BWP switching indication information to the terminal.

In a 5G NR (New Radio) system, in order to improve spatial diversity gain, the base station can communicate with the terminal through multiple antenna panels. In this scenario, there is no perfect solution about how the base station provides BWP switching indication to the terminal.

SUMMARY

According to a first aspect of embodiments of the present disclosure, a method for BWP switching indication on an unlicensed spectrum is provided, including:
  sending by a base station, BWP switching indication information through a second antenna panel, wherein the BWP switching indication information is configured to indicate a first target BWP to be switched to when a terminal communicates with a first antenna panel of the base station;
  wherein, the first target BWP comprises N bandwidth units BWUs of M BWUs detected by the first antenna panel to be idle, where N is less than or equal to M, and both M and N are positive integers.

According to a second aspect of embodiments of the present disclosure, a method for BWP switching indication on an unlicensed spectrum is provided, including:
  receiving by a terminal, BWP switching indication information sent by a second antenna panel of a base station, wherein the BWP switching indication information is configured to indicate a first target BWP to be switched to when the terminal communicates with a first antenna panel of the base station; wherein, the first target BWP comprises N bandwidth units BWUs of M BWUs detected by the first antenna panel to be idle, where N is less than or equal to M, and both M and N are positive integers;
  the terminal switching to the first target BWP for communicating with the first antenna panel according to the BWP switching indication information.

According to a third aspect of embodiments of the present disclosure, an apparatus for BWP switching indication on an unlicensed spectrum is provided, which is applied to a base station, and includes:
  a processor; and
  a memory, configured to store instructions executable by the processor,
  wherein the processor is configured to:
  send BWP switching indication information through a second antenna panel, wherein the BWP switching indication information is configured to indicate a first target BWP to be switched to when a terminal communicates with a first antenna panel of the base station;
  wherein, the first target BWP comprises N bandwidth units BWUs of M BWUs detected by the first antenna panel to be idle, where N is less than or equal to M, and both M and N are positive integers.

According to a fourth aspect of embodiments of the present disclosure, an apparatus for BWP switching indication on an unlicensed spectrum is provided, which is applied to a terminal, and includes:
  a processor; and
  a memory, configured to store instructions executable by the processor,
  wherein the processor is configured to:
  receive BWP switching indication information sent by a second antenna panel of a base station, wherein the BWP switching indication information is configured to indicate a first target BWP to be switched to when the terminal communicates with a first antenna panel of the base station; wherein, the first target BWP includes N bandwidth units BWUs of M BWUs detected by the first antenna panel to be idle, where N is less than or equal to M, and both M and N are positive integers;
  switch to the first target BWP for communicating with the first antenna panel according to the BWP switching indication information.

According to a fifth aspect of embodiments of the present disclosure, there is provided a non-transitory computer readable storage medium, stored thereon with a computer program. When the computer program is executed by a processor, the method according to the first aspect is implemented.

According to a sixth aspect of embodiments of the present disclosure, there is provided a non-transitory computer readable storage medium, stored thereon with a computer program. When the computer program is executed by a processor, the method according to the second aspect is implemented.

It should be understood that the above general description and the following detailed description are only exemplary and explanatory, and cannot limit the present disclosure.

BRIEF DESCRIPTION OF THE DRAWINGS

The appended drawings herein are incorporated into the specification and form a part of the specification, showing conformity with embodiments of the present disclosure and used together with the specification to explain principles of the present disclosure.

DETAILED DESCRIPTION

Exemplary embodiments will be explained in detail here, and examples are shown in the attached drawings. Where the following description relates to appended drawings, the same numbers in different appended drawings indicate the same or similar elements, unless otherwise indicated. Implementations described in the following exemplary embodiments do not represent all implementations consistent with embodiments of the present disclosure. Rather, they are only examples of devices and methods which are consistent with some aspects of embodiments of the disclosure as detailed in the attached claims.

The network architecture and business scenarios described by embodiments of the present disclosure are to more clearly explain technical solutions of embodiments of the present disclosure, but do not constitute limitations on the technical solutions of embodiments of the disclosure. Those skilled in the art may know that, with the evolution of network architecture and the emergence of new business scenarios, the technical solutions provided by embodiments of the present disclosure are also applicable to similar technical problems.

Figure 1:
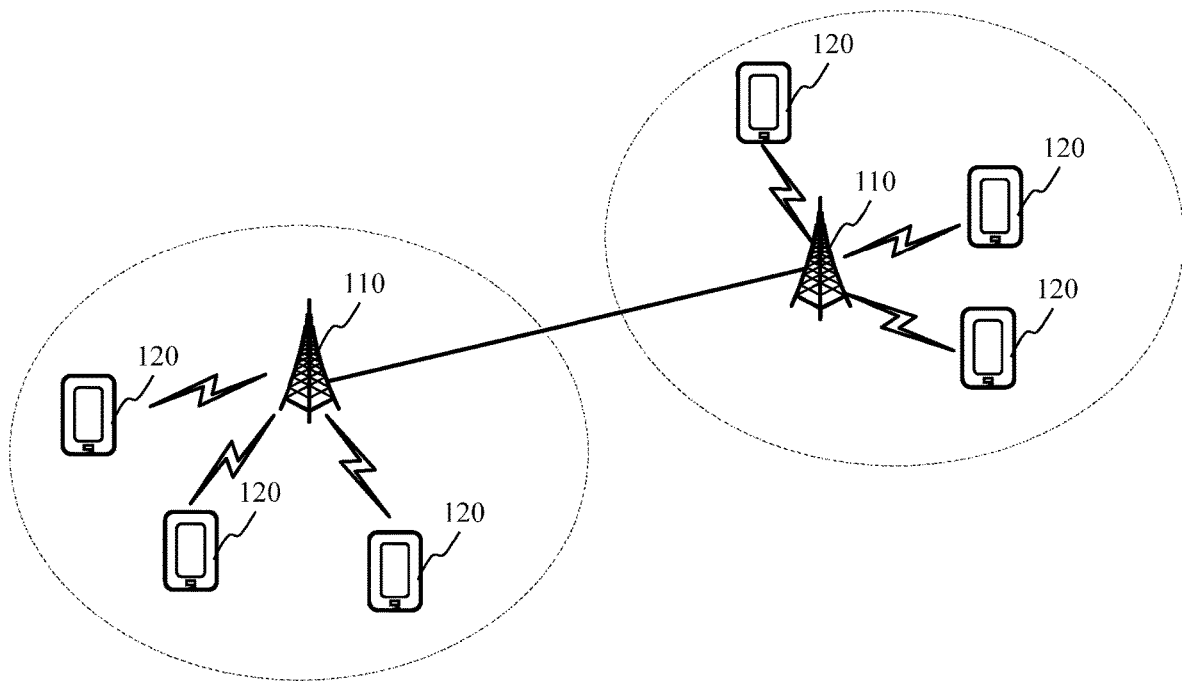
FIG. 1 is a schematic diagram of a network architecture illustrated according to an example embodiment.

FIG. 1 is a schematic diagram of a network architecture illustrated according to an example embodiment. The network architecture may include base stations 110 and terminals 120.

The base station 110 is deployed in an access network. The access network in 5G NR system may be called NG-RAN (New Generation-Radio Access Network). The base station 110 and the terminal 120 communicate with each other through some kind of air interface technology, such as cellular technology.

The base station 110 is a device deployed in an access network to provide wireless communication function for the terminal 120. The base station 110 may include various forms of macro site, micro site, relay station, access point, etc. In systems with different wireless access technologies, the name of the device that functions as a base station may vary, such as gNodeB or gNB in the 5G NR system. As communications technology evolves, the term "base station" may change. For the convenience of description, in embodiments of the present disclosure, the above devices providing wireless communication function for terminals 120 are collectively referred to as base stations. The base station 110 may also be a vehicle-mounted device, which is suitable for vehicle-to-vehicle communication scenarios in the Internet of vehicles. When vehicle-to-vehicle communication occurs, channels or signaling in this disclosure are those suitable for sidelink.

A communications network may include multiple terminals 120. One or more terminals 120 may be distributed in a cell managed by each base station 110. Terminals 120 may include various handheld devices with wireless communication capabilities, vehicle-mounted devices, wearable devices, computing devices or other processing devices connected to a wireless modem, as well as various forms of User Equipment (UE), Mobile Station (MS), terminal devices and so on. For convenience of description, in embodiments of the present disclosure, the devices mentioned above are collectively referred to as terminals. The terminal 120 may also be a vehicle-mounted device, which is suitable for vehicle-to-vehicle communication scenarios in the Internet of vehicles. When vehicle-to-vehicle communication occurs, channels or signaling in this disclosure are those applicable for sidelink.

The "5G NR system" in embodiments of the present disclosure may also be referred to as 5G system or NR system, the meaning of which can be understood by those skilled in the art. The technical solutions described in embodiments of the present disclosure may be applied to the 5G NR system, the subsequent evolution system of the 5G NR system and the 5G NR vehicle network system.

Figure 2:
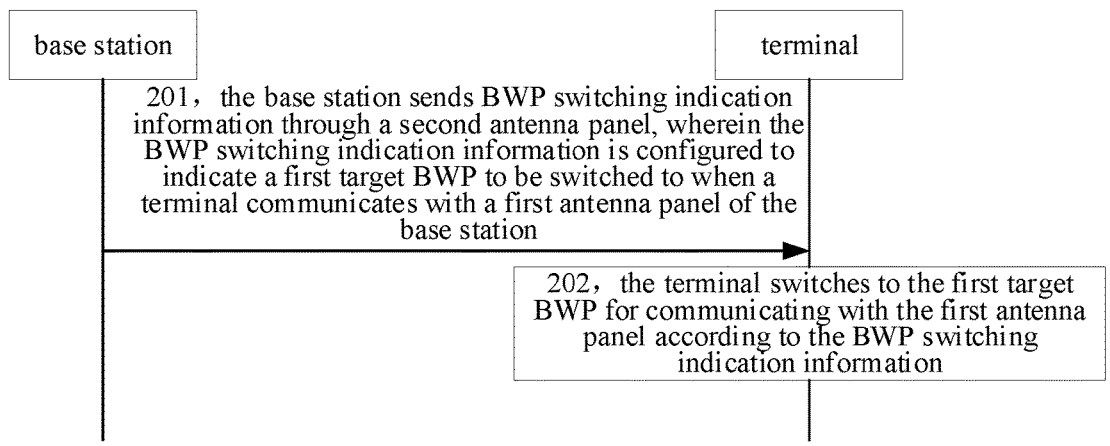
FIG. 2 is a flow chart of a method for BWP switching indication on an unlicensed spectrum illustrated according to an example embodiment.

FIG. 2 is a flow chart of a method for BWP switching indication on an unlicensed spectrum illustrated according to an example embodiment. The method may be applied to the base station of the network architecture shown in FIG. 1. The method may include following steps (201~202).

In step 201, the base station sends BWP switching indication information through a second antenna panel, wherein the BWP switching indication information is configured to indicate a first target BWP to be switched to when a terminal communicates with a first antenna panel of the base station.

In 5G NR systems, the base station and the terminals can each have multiple (i.e. two or more) antenna panels in order to improve spatial diversity gain. For example, the base station has multiple antenna panels, which may belong to the same TRP (Transmitter Receiver Point), or may belong to multiple different TRPs. That is, each TRP may include one antenna panel, or may include multiple antenna panels. The base station can communicate with the terminal through multiple antenna panels, for example, send information to the terminal or receive information sent by the terminal.

The above first target BWP includes N bandwidth units BWUs of M BWUs detected by the first antenna panel to be idle, where N is less than or equal to M, and both M and N are positive integers. BWU refers to the bandwidth unit of LBT (Listen before talk) channel detection, such as 20 MHz. In the unlicensed spectrum, each carrier may contain multiple BWUs, and each BWP may also contain multiple BWUs. Optionally, each BWU may have its own number and correspond to a different position on the channel.

For example, the bandwidth on the carrier may be 100 MHz, each BWU is 20 MHz, and the carrier may include 5 BWUs. For another example, the bandwidth on the carrier may be 400 MHz, each BWU is 20 MHZ, and the carrier may include 20 BWUs.

It should be noted that each carrier represents one service cell. A base station can provide multiple service cells for the terminal, and in each cell, multiple antenna panels may be used to communicate with the terminal in the cell.

In this case, if the channel detection result at the base station indicates that on a certain carrier, only some BWUs are detected to be idle, since the base station can only send PDCCH and PDSCH (Physical Downlink Shared Channel) on the idle BWU, the terminal only needs to monitor whether there are PDCCH and PDSCH on the BWU detected to be idle, thereby saving the power consumption of the terminal.

In embodiments of the present disclosure, the base station has multiple (that is, two or more) antenna panels, and the base station can communicate with the terminal through the multiple antenna panels.

In a possible implementation, the above-mentioned first antenna panel and second antenna panel are two different antenna panels. The second antenna panel transmits BWP switching indication information for indicating the first target BWP to be switched to when the terminal communicates with the first antenna panel of the base station, thereby realizing BWP switching indication to other antenna panels across the antenna panels.

In another possible implementation, the above-mentioned first antenna panel and second antenna panel are the same antenna panel. In this case, the antenna panel can send BWP switching indication information by itself to indicate the target BWP to which it wants to switch.

Optionally, before the base station sends the BWP switching indication information through the second antenna panel, the base station can also perform the LBT process on each BWU of a certain carrier through multiple antenna panels, so as to determine the antenna panel which detects idle channel(s) on each BWU, for example the first antenna panel mentioned above.

Optionally, the above-mentioned first target BWP refers to the BWP including the greatest number of idle BWUs and including the least number of busy BWUs, in all the BWPs configured by the base station for the terminal. By switching the BWP to the BWP containing the greatest number of idle BWUs and containing the least number of busy BWUs, the PDCCH monitoring bandwidth of the terminal is reduced as much as possible.

In an example embodiment, the foregoing BWP switching indication information may include: antenna panel indication information and an identifier of the first target BWP.

The above-mentioned antenna panel indication information is configured to indicate the first antenna panel that the base station communicates with the terminal and needs to perform BWP switching. The antenna panel indication information includes any one of the following: an identifier of the first antenna panel, a reference signal group (or set) identifier corresponding to the first antenna panel, and a reference signal identifier corresponding to the first antenna panel.

Below, a brief introduction to the content included in the antenna panel indication information is given.

(1) The identifier of the first antenna panel is configured to uniquely indicate the first antenna panel. Different antenna panels have different identifiers. The identifier of the antenna panel may be recorded as a panel ID, which may be a character string composed of at least one of numbers, letters, and characters. The terminal can determine the first antenna panel according to the identifier of the first antenna panel.

(2) The reference signal group identifier corresponding to the first antenna panel is configured to indicate the first antenna panel. The reference signal group corresponding to the first antenna panel may include at least one reference signal. The base station may include multiple antenna panels, each antenna panel may include multiple beams, and each beam may send different reference signals, and multiple different reference signals may be grouped into a reference signal group. A certain reference signal group identifier is configured to uniquely indicate the reference signal group, and different antenna panels correspond to different reference signal groups. Therefore, the reference signal group corresponding to a certain antenna panel may represent the antenna panel, for example, the reference signal group identifier corresponding to the first antenna panel may represent the first antenna panel. The terminal can determine the first antenna panel according to the reference signal group identifier corresponding to the first antenna panel.

(3) The reference signal identifier corresponding to the first antenna panel is configured to indicate the first antenna panel. Different antenna panels may send different reference signals. The identifier of a certain reference signal is configured to uniquely indicate the reference signal. Therefore, the reference signal identifier corresponding to a certain antenna panel may represent the antenna panel, for example, the reference signal identifier corresponding to the first antenna panel may represent the first antenna panel. The terminal can determine the first antenna panel according to the reference signal identifier corresponding to the first antenna panel.

The above-mentioned reference signal may be an uplink reference signal, such as SRS (Sounding Reference Signal); or may also be a downlink reference signal, such as SSB (Synchronization Signal Block), CSI-RS (Channel State Information-Reference Signal) and DRS (Dedicated Reference Signal) and so on. For example, if the reference signal is a downlink reference signal, the base station tells the terminal to use the antenna panel that transmits the downlink reference signal as the first antenna panel.

The identifier of the first target BWP is configured to uniquely identify the first target BWP. Different BWPs have different identifiers, and the identifier of BWP may be recorded as BWP ID. When the base station configures the BWP for the terminal, it also configures the BWP ID. For example, the terminal can monitor synchronization signals during random access to obtain the initial BWP, the initial BWP ID may be recorded as 0; for the subsequent BWP configured by the base station for the terminal, the BWP ID may be recorded as 1, 2, 3 . . . . Optionally, for each BWP, the base station may also provide its bandwidth size and bandwidth location, as well as the number and location of each BWU included.

Sending by the base station, the BWP switching indication information through the second antenna panel may include: sending by the base station, PDCCH signaling through the second antenna panel, wherein the PDCCH signaling includes the BWP switching indication information.

Optionally, the foregoing PDCCH signaling may be group common PDCCH signaling, or may be UE-specific PDCCH signaling, which is not limited in embodiments of the present disclosure.

In addition, when there is no need to perform BWP switching, the above-mentioned BWP switching indication information may not be sent, and the current BWP may be directly used for communication.

In step 202, the terminal switches to the first target BWP for communicating with the first antenna panel according to the BWP switching indication information.

After the base station sends the foregoing BWP switching indication information, correspondingly, the terminal receives the BWP switching indication information sent by the second antenna panel of the base station. Furthermore, the terminal can switch to the first target BWP according to the BWP switching indication information, and communicate with the first antenna panel.

In conclusion, in the technical solutions provided by embodiments of the present disclosure, the base station sends BWP switching indication information through the second antenna panel. The BWP switching indication information is configured to the first target BWP to be switched when the terminal communicates with the first antenna panel of the base station. After receiving the BWP switching indication information, the terminal can switch to the first target BWP and communicate with the first antenna panel. Embodiments of the present disclosure provide a solution for BWP switching in a multi-antenna panel scenario, which ensures the accuracy of BWP switching and reduces the power consumption caused by the terminal monitoring the BWP switching indication information sent by the base station, and realizes reliable transmission between the terminal and the base station.

In addition, for the case where the first antenna panel and the second antenna panel are two different antenna panels, embodiments of the present disclosure provide a solution for BWP switching indication across antenna panels, which improves the flexibility of BWP switching indication.

In addition, by switching the BWP to the BWP that contains the greatest number of idle BWUs and contains the least number of busy BWUs, the PDCCH monitoring bandwidth of the terminal is reduced as much as possible.

Below, for the selection of the second antenna panel, the following two possible implementations may be included.

In a first possible implementation, the second antenna panel is an antenna panel within the channel occupation time. That is, the base station can send BWP switching indication information to the terminal through the antenna panel within the channel occupation time. The second antenna panel being in the channel occupation time means that when the first antenna panel of the base station detects that there is an idle BWU, the second antenna panel of the base station is in the process of communicating with the terminal. For example, the base station selects one antenna panel as the second antenna panel from the antenna panels within the channel occupation time, and sends the BWP switching indication information to the terminal.

It should be noted that, compared with the first antenna panel of the base station, the start position of the channel occupation time of the second antenna panel is earlier than the start position of the channel occupation time of the first antenna panel, and the channel occupation time of the second antenna panel has not yet ended when the first antenna panel detects the idle channel(s). That is, before the first antenna panel detects the idle channel(s), the terminal has been monitoring the PDCCH and/or PDSCH sent by the second antenna panel of the base station. Then the base station uses the PDCCH sent by the second antenna panel to indicate the terminal to switch to the first target BWP for communicating with the first antenna panel of the base station, which eliminates the need for the terminal to monitor the first antenna panel of the base station, thereby saving the power consumption of the terminal.

Optionally, when there are multiple antenna panels within the channel occupancy time, the second antenna panel is the antenna panel with the longest remaining channel occupancy time and/or the greatest number of BWUs detected to be idle.

In an example, the second antenna panel is the antenna panel with the longest remaining channel occupation time.

When the base station performs LBT, it needs to select a set of channel detection parameters, including the channel occupation time, contention window size, channel reception priority level, and so on. According to the channel occupation time and the channel length that has been occupied, the remaining channel occupation time can be determined.

For example, when there are 3 antenna panels in the channel occupation time, such as panel #1, panel #2, and panel #3, the remaining channel occupancy time of panel #1 is 1 ms, the remaining channel occupancy time of panel #2 is 3 ms, and the remaining channel occupancy time of panel #3 is 2 ms, then the antenna panel with the longest remaining channel occupancy time, that is, panel #2, can be selected as the second antenna panel.

In another example, the second antenna panel is the antenna panel with the greatest number of BWUs detected to be idle.

For multiple antenna panels, if the number of idle BWUs detected on a certain antenna panel is larger, it means that the channel condition around the antenna panel is better, so the antenna panel can be selected to send information, for example, the BWP switching indication information in embodiments of the present disclosure.

For example, when there are 3 antenna panels in the channel occupation time, such as panel #1, panel #2, and panel #3, in which panel #1 detects 5 idle BWUs, panel #2 detects 2 idle BWUs, and panel #3 detects 1 idle BWU, then the antenna panel with the greatest number of BWUs detected to be idle, that is, panel #1, can be selected as the second antenna panel.

In yet another example, the second antenna panel is the antenna panel with the longest remaining channel occupation time and the greatest number of BWUs detected to be idle.

For example, when there are 3 antenna panels in the channel occupation time, such as panel #1, panel #2, and panel #3, in which the remaining channel occupancy time of panel #1 is 3 ms, the remaining channel occupancy time of panel #2 is 3 ms, and the remaining channel occupancy time of panel #3 is 1 ms; but panel #1 detects that there are 5 idle BWUs, panel #2 detects that there are 2 idle BWUs, and panel #3 detects that there is 1 idle BWU, then the antenna panel with the longest remaining channel occupation time and the greatest number of BWUs detected to be idle, that is, panel #1, can be selected as the second antenna panel.

In other possible implementations, when there are multiple antenna panels within the channel occupation time, the base station first selects the antenna panel with the longest remaining channel occupation time from the multiple antenna panels. If the number of the antenna panel with the longest remaining channel occupation time is 1, then this antenna panel is directly determined as the second antenna panel. If the number of antenna panels with the longest remaining channel occupation time is greater than 1, then the antenna panel with the greatest number of BWUs detected to be idle is further selected from these antenna panels with the longest remaining channel occupation time, as the second antenna panel. If there are still multiple antenna panels with the greatest number of BWUs detected to be idle in the antenna panels with the longest remaining channel occupation time, any antenna channel may be selected as the second antenna panel from the antenna panels with the greatest number of BWUs detected to be idle. Alternatively, an antenna panel can be selected as the second antenna panel according to other selection rules, such as selecting the antenna panel with the lightest load as the second antenna panel, etc., which is not limited in the embodiments of the present disclosure.

Alternatively, when there are multiple antenna panels within the channel occupancy time, the base station first selects the antenna panel with the greatest number of BWUs detected to be idle from the multiple antenna panels. If the number of the antenna panels with the greatest number of BWUs detected to be idle is 1, the antenna panel is directly determined as the second antenna panel. If the number of antenna panels with the greatest number of BWUs detected to be idle is greater than 1, then the antenna panel with the longest remaining channel occupation time is further selected from these antenna panels with the greatest number of BWUs detected to be idle, as the second antenna panel. If there are still multiple antenna panels with the longest remaining channel occupation time in the antenna panels with the greatest number of BWUs detected to be idle, any antenna panel may be selected as the second antenna panel from the antenna panels with the longest remaining channel occupation time. Alternatively, an antenna panel can be selected as the second antenna panel according to other selection rules, for example, the antenna panel with the lightest load is selected as the second antenna panel, etc., which is not limited in embodiments of the present disclosure.

In a second possible implementation, the second antenna panel is an antenna panel that detects the idle channel(s). That is, the second antenna panel and the first antenna panel of the base station detect the idle channel(s) at the same time, and in the following channel occupation time, the base station can send the BWP switching indication information to the terminal through the antenna panel with the idle channel(s) detected. For example, the base station selects one antenna panel as the second antenna panel from the antenna panels that detect the idle channel(s), and sends the BWP switching indication information to the terminal through the selected antenna panel.

It should be noted that the channel occupancy time of the second antenna panel and the channel occupancy time of the first antenna panel start at the same time.

Optionally, when there are multiple antenna panels that detect the idle channel(s), the second antenna panel is the antenna panel with the longest remaining channel occupation time and/or the greatest number of BWUs detected to be idle.

In an example, the second antenna panel is the antenna panel with the longest remaining channel occupation time.

For multiple antenna panels that detect idle channel(s), the channel detection mechanisms and/or channel detection parameters used are different, and the corresponding channel occupation time may be different. Some antenna panels have a longer channel occupation time, while some antennas panels have a relatively shorter channel occupation time. Further, the remaining channel occupancy time of multiple antenna panels may also be different.

For example, when there are 3 antenna panels that detect idle channel(s), such as panel #1, panel #2, and panel #3, in which the remaining channel occupancy time of panel #1 is 1 ms, the remaining channel occupancy time of panel 2 is 3 ms, and the remaining channel occupancy time of panel #3 is 2 ms, then the antenna panel with the longest remaining channel occupancy time, namely panel #2, can be selected as the second antenna panel.

In another example, the second antenna panel is the antenna panel with the greatest number of BWUs detected to be idle.

For example, when there are 3 antenna panels that detect the idle channel(s), such as panel #1, panel #2, and panel #3, in which panel #1 detects 5 idle BWUs, panel #2 detects 2 idle BWUs, and panel #3 detects 1 idle BWU, then the antenna panel with the greatest number of BWUs detected to be idle, namely panel #1, can be selected as the second antenna panel.

In yet another example, the second antenna panel is the antenna panel with the longest remaining channel occupation time and the greatest number of BWUs detected to be idle.

For example, when there are 3 antenna panels that detect the idle channel(s), such as panel #1, panel #2, and panel #3, in which, the remaining channel occupancy time of panel #1 is 3 ms, the remaining channel occupancy time of panel #2 is 3 ms, and the remaining channel occupancy time of panel #3 is 1 ms; but panel #1 detects 5 idle BWUs, panel #2 detects 2 idle BWUs, and panel #3 detects 1 idle BWU, then the antenna panel with the longest remaining channel occupation time and the greatest number of BWUs detected to be idle, that is, panel #1, can be selected as the second antenna panel.

In other possible implementations, when there are multiple antenna panels that detect idle channel(s), the base station first selects the antenna panel with the longest remaining channel occupation time from the multiple antenna panels. If the number of the antenna panel with the longest remaining channel occupation time is 1, then this antenna panel is directly determined as the second antenna panel. If the number of antenna panels with the longest remaining channel occupation time is greater than 1, then the antenna panel with the greatest number of BWUs detected to be idle is further selected as the second antenna panel from the antenna panels with the longest remaining channel occupation time. If there are still more than one antenna panel with the greatest number of BWUs detected to be idle among the antenna panels with the longest remaining channel occupation time, any antenna panel can be selected as the second antenna panel from these antenna panels with the greatest number of BWUs detected to be idle. Alternatively, an antenna panel can be selected as the second antenna panel according to other selection rules, such as selecting the antenna panel with the lightest load as the second antenna panel, etc., which is not limited in embodiments of the present disclosure.

Alternatively, when there are multiple antenna panels that detect idle channel(s), the base station first selects the antenna panel with the greatest number of BWUs detected to be idle from the multiple antenna panels. If the number of the antenna panel with the greatest number of BWUs detected to be idle is 1, then this antenna panel is directly determined as the second antenna panel. If the number of antenna panels with the greatest number of BWUs detected to be idle is greater than 1, then the antenna panel with the longest remaining channel occupation time is further selected as the second antenna panel from the antenna panels with the greatest number of BWUs detected to be idle. If there is still more than one antenna panel with the longest remaining channel occupation time in the antenna panels with the greatest number of BWUs detected to be idle, then any antenna panel can be selected as the second antenna panel from the antenna panels with the longest remaining channel occupation time. Alternatively, one antenna panel can be selected as the second antenna panel according to other selection rules, for example, the antenna panel with the lightest load is selected as the second antenna panel, etc., which is not limited in embodiments of the present disclosure.

Optionally, for the first possible implementation, when there are multiple antenna panels within the channel occupation time, the antenna panel with the longest remaining channel occupation time is preferentially selected as the second antenna panel; for the second possible implementation, when there are multiple antenna panels that detect idle channel(s), the antenna panel with the greatest number of BWUs detected to be idle is preferentially selected as the second antenna panel.

In addition, in this case, if the first antenna panel and the second antenna panel are two different antenna panels, the BWP switching indication information may also be configured to indicate the second target BWP to which the second antenna panel is to be switched. It should be noted that the above-mentioned first target BWP and second target BWP may be the same BWP or different BWPs, which is not limited in the embodiments of the present disclosure.

In addition, if the above-mentioned BWP switching indication information includes the target BWPs to be switched to when the multiple antenna panels respectively communicate with the terminal, the target BWPs to be switched to when the multiple antenna panels respectively communicate with the terminal may be the same BWP, or may be different BWPs.

Optionally, when there is one antenna panel that detect idle channel(s), the second antenna panel is the antenna panel with idle channel(s). The antenna panel with idle channel(s) may send the BWP switching indication information by itself to indicate the target BWP to which it wants to switch.

In summary, when selecting the second antenna panel that sends the BWP switching indication information to the terminal, embodiments of the present disclosure provide multiple selection methods for the second antenna panel, which improves the flexibility of selecting the second antenna panel.

It should be noted that, in the foregoing method embodiments, the technical solutions of the present disclosure are introduced and explained only from the perspective of interaction between the terminal and the base station. The above-mentioned steps performed by the terminal can be separately implemented as a method for BWP switching indication on the unlicensed spectrum on the terminal side, and the above-mentioned steps performed by the base station can be separately implemented as a method for BWP switching indication on the unlicensed spectrum on the base station side.

The following are apparatus embodiments of the present disclosure, which can be configured to implement the method embodiments of the present disclosure. For details that are not disclosed in the apparatus embodiments of the present disclosure, please refer to the method embodiments of the present disclosure.

Figure 3:
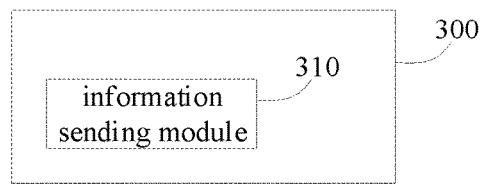
FIG. 3 is a block diagram of an apparatus for BWP switching indication on an unlicensed spectrum illustrated according to an example embodiment.

FIG. 3 is a block diagram of an apparatus for BWP switching indication on an unlicensed spectrum illustrated according to an example embodiment. The apparatus has the function of implementing the example of the method on the side of the base station, and the function may be implemented by hardware, or by hardware executing corresponding software. The apparatus may be the base station described above, or may be set in the base station. As shown in FIG. 3, the apparatus 300 may include an information sending module 310.

The information sending module 310 is configured to send BWP switching indication information through a second antenna panel, wherein the BWP switching indication information is configured to indicate a first target BWP to be switched to when a terminal communicates with a first antenna panel of the base station; wherein, the first target BWP includes N bandwidth units BWUs of M BWUs detected by the first antenna panel to be idle, where N is less than or equal to M, and both M and N are positive integers.

In summary, in the technical solutions provided by embodiments of the present disclosure, the base station sends the BWP switching indication information through the second antenna panel. The BWP switching indication information is configured to indicate the first target BWP to be switched to when the terminal communicates with the first antenna panel of the base station. After receiving the BWP switching indication information, the terminal can switch to the first target BWP and communicate with the first antenna panel. The embodiments of the present disclosure provide a solution for BWP switching in a multi-antenna panel scenario, which ensures the accuracy of BWP switching and reduces the power consumption caused by the terminal monitoring the BWP switching indication information sent by the base station, and realizes reliable transmission between the terminal and the base station.

In an example embodiment, the BWP switching indication information includes: antenna panel indication information and an identifier of the first target BWP; wherein, the antenna panel indication information includes any one of the following: an identifier of the first antenna panel, a reference signal group identifier corresponding to the first antenna panel, and a reference signal identifier corresponding to the first antenna panel.

In an example embodiment, the second antenna panel is an antenna panel within a channel occupation time.

In an example embodiment, when there are multiple antenna panels within the channel occupation time, the second antenna panel is an antenna panel with the longest remaining channel occupation time and/or the greatest number of BWUs detected to be idle.

In an example embodiment, the second antenna panel is an antenna panel that detects idle channel(s).

In an example embodiment, when there are multiple antenna panels that detect idle channel(s), the second antenna panel is an antenna panel with the longest remaining channel occupancy time and/or the greatest number of BWUs detected to be idle.

In an example embodiment, the BWP switching indication information is further configured to indicate a second target BWP to which the second antenna panel is to be switched.

In an example embodiment, the information sending module 310 is configured to send a physical downlink control channel PDCCH signaling through the second antenna panel, wherein the PDCCH signaling includes the BWP switching indication information.

Figure 4:
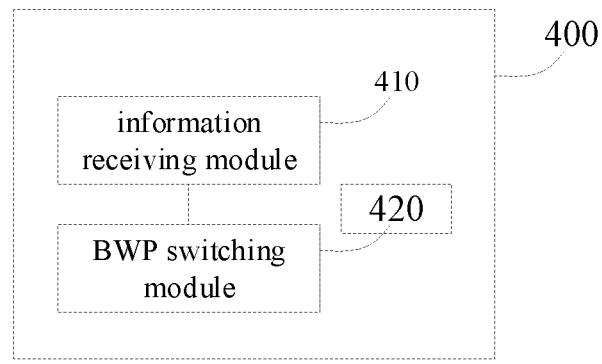
FIG. 4 is a block diagram of an apparatus for BWP switching indication on an unlicensed spectrum illustrated according to another example embodiment.

FIG. 4 is a block diagram of an apparatus for BWP switching indication on an unlicensed spectrum illustrated according to another example embodiment. The apparatus has the function of implementing the example of the method on the side of the terminal, and the function may be implemented by hardware, or by hardware executing corresponding software. The apparatus may be the terminal described above, or may be set in the terminal. As shown in FIG. 4, the apparatus 400 may include an information receiving module 410 and a BWP switching module 420.

The information receiving module 410 is configured to receive BWP switching indication information sent by a second antenna panel of a base station, wherein the BWP switching indication information is configured to indicate a first target BWP to be switched to when the terminal communicates with a first antenna panel of the base station; wherein, the first target BWP includes N bandwidth units BWUs of M BWUs detected by the first antenna panel to be idle, where N is less than or equal to M, and both M and N are positive integers.

The BWP switching module 420 is configured to switch to the first target BWP for communicating with the first antenna panel according to the BWP switching indication information.

In summary, in the technical solutions provided by embodiments of the present disclosure, the base station sends the BWP switching indication information through the second antenna panel. The BWP switching indication information is configured to indicate the first target BWP to be switched to when the terminal communicates with the first antenna panel of the base station. After receiving the BWP switching indication information, the terminal can switch to the first target BWP and communicate with the first antenna panel. The embodiments of the present disclosure provide a solution for BWP switching in a multi-antenna panel scenario, which ensures the accuracy of BWP switching and reduces the power consumption caused by the terminal monitoring the BWP switching indication information sent by the base station, and realizes reliable transmission between the terminal and the base station.

It should be noted that, when the apparatus provided in the above embodiment implements its functions, the division of the above-mentioned functional modules is used only as an example for illustration. In actual applications, the above-mentioned functions may be allocated to different functional modules according to actual needs. That is, the content structure of the apparatus is divided into different functional modules to complete all or part of the functions described above.

Regarding the apparatus in the foregoing embodiments, the specific manner in which each module performs the operation has been described in detail in the embodiments of the method, and detailed description will not be given here.

An example embodiment of the present disclosure also provides an apparatus for BWP switching indication on an unlicensed spectrum. The apparatus may be applied to the base station described above, and can implement the method for BWP switching indication on the unlicensed spectrum on the side of the base station provided by the present disclosure. The apparatus may include a processor, and a memory for storing executable instructions of the processor. The processor is configured to:

send BWP switching indication information through a second antenna panel, wherein the BWP switching indication information is configured to indicate a first target BWP to be switched to when a terminal communicates with a first antenna panel of the base station; wherein, the first target BWP includes N bandwidth units BWUs of M BWUs detected by the first antenna panel to be idle, where N is less than or equal to M, and both M and N are positive integers.

In an example embodiment, the BWP switching indication information includes: antenna panel indication information and an identifier of the first target BWP; wherein, the antenna panel indication information includes any one of the following: an identifier of the first antenna panel, a reference signal group identifier corresponding to the first antenna panel, and a reference signal identifier corresponding to the first antenna panel.

In an example embodiment, the second antenna panel is an antenna panel within a channel occupation time.

In an example embodiment, when there are multiple antenna panels within the channel occupation time, the second antenna panel is an antenna panel with the longest remaining channel occupation time and/or the greatest number of BWUs detected to be idle.

In an example embodiment, the second antenna panel is an antenna panel that detects idle channel(s).

In an example embodiment, when there are multiple antenna panels that detect idle channel(s), the second antenna panel is an antenna panel with the longest remaining channel occupancy time and/or the greatest number of BWUs detected to be idle.

In an example embodiment, the BWP switching indication information is further configured to indicate a second target BWP to which the second antenna panel is to be switched.

In an example embodiment, the information sending module 310 is further configured to send a physical downlink control channel PDCCH signaling through the second antenna panel, wherein the PDCCH signaling includes the BWP switching indication information.

An example embodiment of the present disclosure also provides an apparatus for BWP switching indication on an unlicensed spectrum. The apparatus may be applied to the terminal described above, and can implement the method for BWP switching indication on the unlicensed spectrum on the side of the terminal provided by the present disclosure. The apparatus may include a processor, and a memory for storing executable instructions of the processor. The processor is configured to:

receive BWP switching indication information sent by a second antenna panel of a base station, wherein the BWP switching indication information is configured to indicate a first target BWP to be switched to when the terminal communicates with a first antenna panel of the base station; wherein, the first target BWP includes N bandwidth units BWUs of M BWUs detected by the first antenna panel to be idle, where N is less than or equal to M, and both M and N are positive integers; and switch to the first target BWP for communicating with the first antenna panel according to the BWP switching indication information.

The foregoing mainly introduces the solutions provided by embodiments of the present disclosure from the perspective of the base station and the terminal. It can be understood that, in order to implement the above-mentioned functions, the base station and the terminal include hardware structures and/or software modules corresponding to respective functions. In combination with the units and algorithm steps of the examples described in the embodiments disclosed in the present disclosure, the embodiments of the present disclosure can be implemented in the form of hardware or a combination of hardware and computer software. Whether a certain function is executed by hardware or computer software-driven hardware depends on the specific application and design constraint conditions of the technical solution. Those skilled in the art can use different methods for each specific application to implement the described functions, but such implementation should not be considered as going beyond the scope of the technical solutions of the embodiments of the present disclosure.

Figure 5:
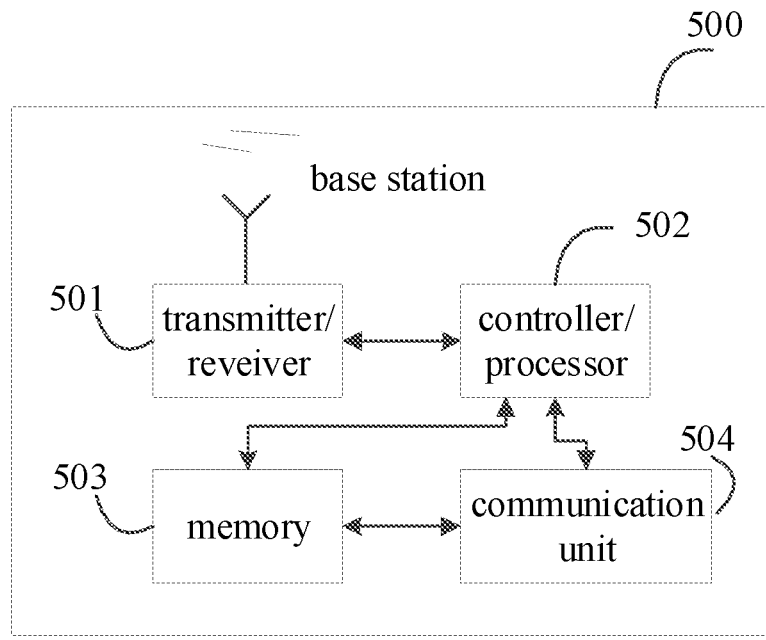
FIG. 5 is a block diagram of a base station illustrated according to an example embodiment.

FIG. 5 is a schematic structural diagram showing a base station according to an example embodiment.

The base station 500 includes a transmitter/receiver 501 and a processor 502. The processor 502 may also be a controller, which is represented as "controller/processor 502" in FIG. 5. The transmitter/receiver 501 is used to support sending and receiving information between the base station and the terminal in the foregoing embodiments, and to support communication between the base station and other network entities. The processor 502 performs various functions for communicating with the terminal. In the uplink, the uplink signal from the terminal is received via the antenna, demodulated by the receiver 501 (for example, the high-frequency signal is demodulated into a baseband signal), and further processed by the processor 502 to restore the service data and signaling information sent by the terminal. On the downlink, service data and signaling messages are processed by the processor 502, and modulated by the transmitter 601 (for example, the baseband signal is modulated into a high-frequency signal) to generate a downlink signal, which is transmitted to the terminal via the antenna. It should be noted that the above-mentioned demodulation or modulation function may also be completed by the processor 502. For example, the processor 502 is further configured to execute various steps on the base station side in the foregoing method embodiments, and/or other steps of the technical solutions described in the embodiments of the present disclosure.

Further, the base station 500 may further include a memory 503, and the memory 503 is used to store program codes and data of the base station 500. In addition, the base station may also include a communication unit 504. The communication unit 504 is used to support the base station to communicate with other network entities (for example, network devices in the core network, etc.). For example, in a 5G NR system, the communication unit 504 may be an NG-U interface to support communication between the base station and a UPF (User Plane Function) entity; or, the communication unit 504 may also be an NG-C Interface, used to support access to AMF (Access and Mobility Management Function) entities for communication.

It can be understood that FIG. 5 only shows a simplified design of the base station 500. In practical applications, the base station 500 may include any number of transmitters, receivers, processors, controllers, memories, communication units, etc., and all base stations that can implement the embodiments of the present disclosure are within the protection scope of the embodiments of the present disclosure.

Figure 6:
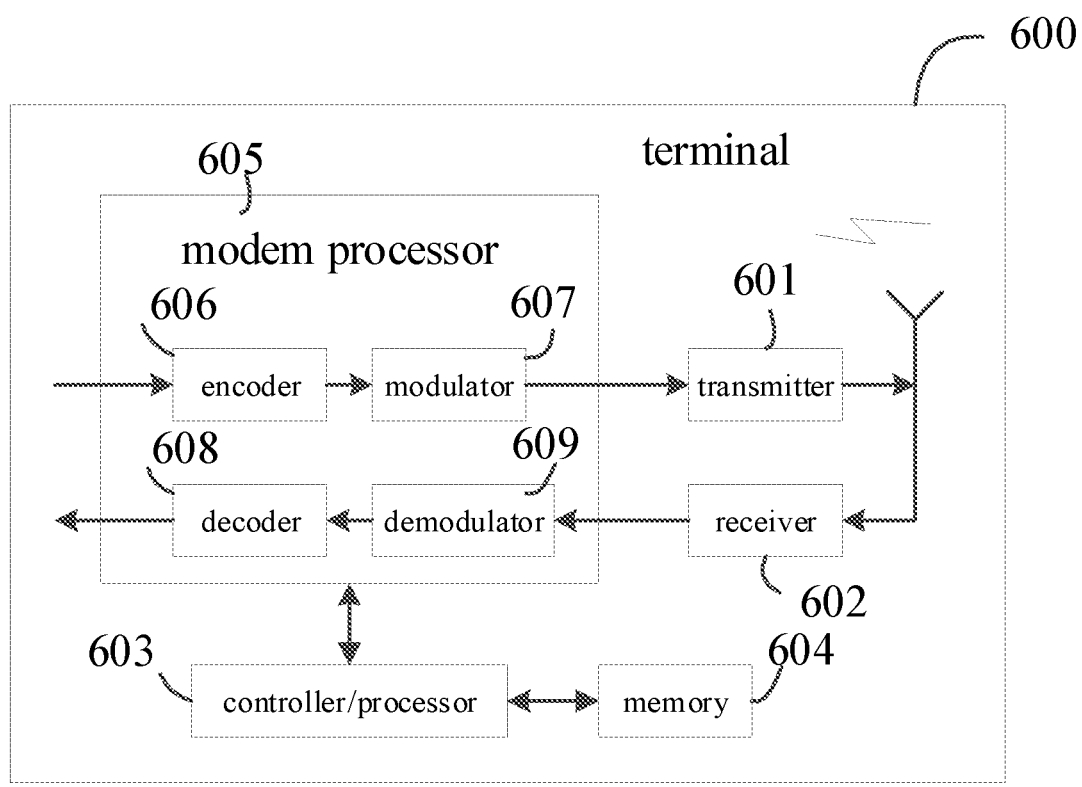
FIG. 6 is a block diagram of a terminal illustrated according to an example embodiment.

FIG. 6 is a schematic structural diagram of a terminal according to an example embodiment.

The terminal 600 includes a transmitter 601, a receiver 602, and a processor 603. The processor 603 may also be a controller, which is represented as "controller/processor 603" in FIG. 6. Optionally, the terminal 600 may further include a modem processor 605, where the modem processor 605 may include an encoder 606, a modulator 607, a decoder 608, and a demodulator 609.

In an example, the transmitter 601 adjusts (e.g., performs analog conversion, filtering, amplification, and upconversion, etc.) the output samples and generates an uplink signal, which is transmitted to the base station via an antenna. On the downlink, the antenna receives the downlink signal transmitted by the base station. The receiver 602 adjusts (e.g., filters, amplifies, down-converts, and digitizes, etc.) the signal received from the antenna and provides input samples. In the modem processor 605, the encoder 606 receives service data and signaling messages to be transmitted on the uplink, and processes the service data and signaling messages (for example, performs formatting, encoding, and interleaving). The modulator 607 further processes (for example, performs symbol mapping and modulation) the encoded service data and signaling messages and provides output samples. The demodulator 609 processes (e.g., demodulates) the input samples and provides symbol estimates. The decoder 608 processes (e.g., de-interleaves and decodes) the symbol estimates and provides decoded data and signaling messages sent to the terminal 600. The encoder 606, the modulator 607, the demodulator 609, and the decoder 608 may be implemented by a synthesized modem processor 605. These units are processed according to the radio access technology adopted by the radio access network (for example, 5G NR and other access technologies of the evolved system). It should be noted that when the terminal 600 does not include the modem processor 605, the foregoing functions of the modem processor 605 may also be performed by the processor 603.

The processor 603 controls and manages the actions of the terminal 600, and is used to execute the processing procedure performed by the terminal 600 in the foregoing embodiments of the present disclosure. For example, the processor 603 is further configured to execute each step on the terminal side in the foregoing method embodiments, and/or other steps of the technical solution described in the embodiments of the present disclosure.

Further, the terminal 600 may further include a memory 604, and the memory 604 is configured to store program codes and data for the terminal 600.

It can be understood that FIG. 6 only shows a simplified design of the terminal 600. In practical applications, the terminal 600 may include any number of transmitters, receivers, processors, modem processors, memories, etc., and all terminals that can implement the embodiments of the present disclosure are within the protection scope of the embodiments of the present disclosure.

Embodiments of the present disclosure also provide a non-transitory computer-readable storage medium on which a computer program is stored. When the computer program is executed by the processor of the base station, the method for BWP switching indication on the unlicensed spectrum on the base station side is implemented.

Embodiments of the present disclosure also provide a non-transitory computer-readable storage medium on which a computer program is stored. When the computer program is executed by the processor of the terminal, the method for BWP switching indication on the unlicensed spectrum on the terminal side is implemented.

It should be understood that the "multiple" mentioned herein refers to two or more. "And/or" describes the association relationship of the associated objects, indicating that there may be three types of relationships. For example, A and/or B may mean: A alone exists, A and B exist at the same time, and B exists alone. The character "/" generally indicates that the associated objects before and after are in an "or" relationship.

After considering the specification and practicing the disclosure herein, those skilled in the art will easily think of other examples of the present application. The present application is intended to cover any variations, usages, or adaptive changes of the present application. These variations, usages, or adaptive changes follow the general principles of the present application and include common knowledge or conventional technical means in the technical field not disclosed by the present application. The description and the examples are to be regarded as exemplary only, and the true scope and spirit of the present application are referred to the appended claims.

It should be understood that the present disclosure is not limited to the precise structure described above and shown in the drawings, and various modifications and changes may be made without departing from its scope. The scope of embodiments of the present disclosure is only limited by the appended claims.

What is claimed is:

1. A method for Bandwidth Part (BWP) switching indication on an unlicensed spectrum, performed by a base station having a plurality of antenna panels, the method comprising:
sending, BWP switching indication information through a second antenna panel among the plurality of antenna panels, wherein the BWP switching indication information is configured to indicate a first target BWP to be switched to when a terminal communicates with a first antenna panel among the plurality of antenna panels;
wherein, the first antenna panel and the second antenna panel are different antenna panels, and the first target BWP comprises N bandwidth units BWUs of M BWUs detected by the first antenna panel to be idle, where N is less than or equal to M, and both M and N are positive integers.

2. The method of claim 1, wherein the BWP switching indication information comprises: antenna panel indication information and an identifier of the first target BWP;
wherein, the antenna panel indication information comprises any one of the following: an identifier of the first antenna panel, a reference signal group identifier corresponding to the first antenna panel, and a reference signal identifier corresponding to the first antenna panel.

3. The method of claim 1, wherein the second antenna panel is an antenna panel within a channel occupation time.

4. The method of claim 3, wherein when there are multiple antenna panels within the channel occupation time, the second antenna panel is an antenna panel with the longest remaining channel occupation time and/or the greatest number of BWUs detected to be idle.

5. The method of claim 1, wherein the second antenna panel is an antenna panel that detects idle channel(s).

6. The method of claim 5, wherein when there are multiple antenna panels that detect idle channel(s), the second antenna panel is an antenna panel with the longest remaining channel occupancy time and/or the greatest number of BWUs detected to be idle.

7. The method of claim 1, wherein the BWP switching indication information is further configured to indicate a second target BWP to which the second antenna panel is to be switched.

8. The method of claim 1, wherein sending by the base station, BWP switching indication information through the second antenna panel comprises:
sending by the base station, a physical downlink control channel PDCCH signaling through the second antenna panel, wherein the PDCCH signaling comprises the BWP switching indication information.

9. A method for Bandwidth Part (BWP) switching indication on an unlicensed spectrum, comprising:
receiving by a terminal, BWP switching indication information sent by a second antenna panel of a base station having a plurality of antenna panels, wherein the BWP switching indication information is configured to indicate a first target BWP to be switched to when the terminal communicates with a first antenna panel among the plurality of antenna panels; wherein, the first antenna panel and the second antenna panel are different antenna panels, and the first target BWP comprises N bandwidth units BWUs of M BWUs detected by the first antenna panel to be idle, where N is less than or equal to M, and both M and N are positive integers;
the terminal switching to the first target BWP for communicating with the first antenna panel according to the BWP switching indication information.

10. An apparatus for Bandwidth Part (BWP) switching indication on an unlicensed spectrum in a base station having a plurality of antenna panels, comprising:
a processor; and
a memory, configured to store instructions executable by the processor,
wherein the processor is configured to:
send BWP switching indication information through a second antenna panel among the plurality of antenna panels, wherein the BWP switching indication information is configured to indicate a first target BWP to be switched to when a terminal communicates with a first antenna panel among the plurality of antenna panels;
wherein, the first antenna panel and the second antenna panel are different antenna panels, and the first target BWP comprises N bandwidth units BWUs of M BWUs detected by the first antenna panel to be idle, where N is less than or equal to M, and both M and N are positive integers.

11. An apparatus for Bandwidth Part (BWP) switching indication on an unlicensed spectrum in a terminal, comprising:
a processor; and
a memory, configured to store instructions executable by the processor,
wherein the processor is configured to implement the method of claim 9 by executing the instructions stored in the memory.

12. The apparatus of claim 10, wherein the BWP switching indication information comprises: antenna panel indication information and an identifier of the first target BWP;
wherein, the antenna panel indication information comprises any one of the following: an identifier of the first antenna panel, a reference signal group identifier corresponding to the first antenna panel, and a reference signal identifier corresponding to the first antenna panel.

13. The apparatus of claim 10, wherein the second antenna panel is an antenna panel within a channel occupation time.

14. The apparatus of claim 13, wherein when there are multiple antenna panels within the channel occupation time, the second antenna panel is an antenna panel with the longest remaining channel occupation time and/or the greatest number of BWUs detected to be idle.

15. The apparatus of claim 10, wherein the second antenna panel is an antenna panel that detects idle channel(s).

16. The apparatus of claim 15, wherein when there are multiple antenna panels that detect idle channel(s), the second antenna panel is an antenna panel with the longest remaining channel occupancy time and/or the greatest number of BWUs detected to be idle.

17. The apparatus of claim 10, wherein the BWP switching indication information is further configured to indicate a second target BWP to which the second antenna panel is to be switched.

18. The apparatus of claim 10, wherein the processor is configured to:
 send a physical downlink control channel PDCCH signaling through the second antenna panel, wherein the PDCCH signaling comprises the BWP switching indication information.

\* \* \* \* \*